United States Patent
Campbell

(10) Patent No.: US 6,170,532 B1
(45) Date of Patent: Jan. 9, 2001

(54) FLEXIBLE HOSE

(75) Inventor: Scott P. Campbell, Sylvania, OH (US)

(73) Assignee: Aeroquip Corporation, Maumee, OH (US)

( * ) Notice: Under 35 U.S.C. 154(b), the term of this patent shall be extended for 0 days.

(21) Appl. No.: 09/237,481

(22) Filed: Jan. 26, 1999

(51) Int. Cl.[7] .................................................. F16L 11/10
(52) U.S. Cl. .......................... 138/126; 138/137; 138/141
(58) Field of Search .................................. 138/124, 125, 138/126, 137, 141

(56) References Cited

U.S. PATENT DOCUMENTS

| | | | |
|---|---|---|---|
| 4,091,843 | * 5/1978 | Mikes et al. | 138/127 |
| 4,482,592 | * 11/1984 | Kramer | 428/67 |
| 4,559,095 | * 12/1985 | Babbin | 138/126 |
| 4,842,024 | * 6/1989 | Palinchak | 138/126 |
| 4,870,995 | * 10/1989 | Igarashi et al. | 138/125 |
| 4,905,735 | 3/1990 | Akiyoshi . | |
| 4,923,550 | * 5/1990 | Kramer | 428/450 |
| 4,998,564 | 3/1991 | Igarashi et al. . | |
| 5,016,675 | * 5/1991 | Igarashi et al. | 138/125 |
| 5,093,166 | 3/1992 | Nishimura . | |
| 5,145,628 | 9/1992 | Karg et al. . | |
| 5,264,262 | * 11/1993 | Igarashi | 138/125 |
| 5,316,046 | * 5/1994 | Igarashi et al. | 138/125 |
| 5,348,779 | * 9/1994 | Igarashi | 138/126 |
| 5,462,091 | 10/1995 | Saupe . | |
| 6,029,712 | * 2/2000 | Dougherty | 138/137 |

\* cited by examiner

*Primary Examiner*—James Hook
(74) *Attorney, Agent, or Firm*—Emch, Schaffer, Schaub & Porcello Co., L.P.A.

(57) ABSTRACT

This new sewer cleaning hose is a rubber hose that concentrates on the ability to improve flexibility and cover resistance to cutting and abrasion while providing a six inch minimum bend radius. What makes this hose design unique is the low friction the hose cover offers under operation. No other sewer hose offers the easy capability of routing through sewer applications like the proposed new hose design. The hose comprises an inner tube of an acrylonitrile rubber and an outer cover of UHMW plastic.

12 Claims, 1 Drawing Sheet

FLEXIBLE HOSE

TECHNICAL FIELD

This invention relates to hoses that exhibit improved flexibility and improved abrasion resistance, and a cover with a low coefficient of friction for use in sewer cleaning applications.

BACKGROUND ART

The change in sewer construction materials across the world has required a new type of cleaning hose. Whether the sewer walls are lined with concrete or tiles, one hose must have the capability of cleaning all types of sewers. To date, all rubber and all thermoplastic hoses have been used to clean sewers. A hybrid hose construction has been developed that employs the use of a thermoplastic cover in conjunction with a rubber inner tube and backing layer. The tough, thermoplastic cover provides the necessary abrasion resistance and low coefficient of friction required for easy hose routing in sewer environments. The existence of rubber provides for flexibility and kink resistance. This hybrid hose construction also provides the unique combination of properties that all rubber and all thermoplastic hoses do not.

DISCLOSURE OF INVENTION

I have developed a new sewer cleaning hose. My new rubber hose concentrates on the ability to improve flexibility and cover resistance to cutting and abrasion while providing a six inch minimum bend radius for a 1 inch I.D. hose. The reduction in bend radius allows sewer trucks to have a smaller hose reel placed at the front of a vehicle increasing the line of sight. Fitting retention, kink resistance, reduction in overall weight, internal and external fluid resistance, and ozone resistance also have been addressed. What makes this hose design unique is the low friction the hose cover offers under operation. No other sewer hose offers the easy capability of routing through sewer applications like the proposed new hose design. Also, the use of one reinforcement braid, instead of the usual two textile bands, results in the further reduction in overall envelope weight and facilitates the use of smaller hose reels. The use of Kevlar® fibers further reduces the extent of volumetric or cubical expansion the hose experiences under application.

Generally, my hose comprises an inner tube of an acrylonitrile rubber layer, a reinforcing layer adjacent the inner tube, an EPDM rubber backing layer adjacent the reinforcing layer and a UHMW plastic outer cover adjacent the EPDM backing layer.

BEST MODE OF CARRYING OUT INVENTION

Figure 1:
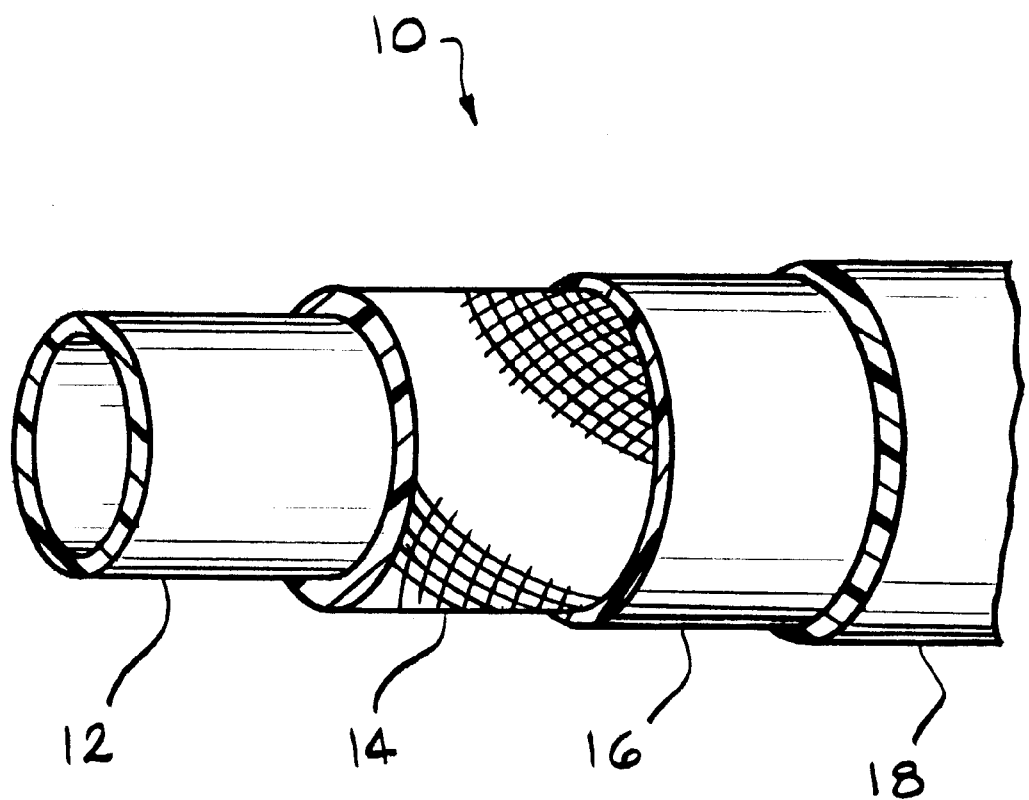
FIG. 1 is a perspective view, partly cut away, illustrating a hose using the composite of this invention.

FIG. 1 shows hose 10 of this invention. Hose 10 is a multi-layer structure comprising inner tube 12, reinforcing layer 14, rubber backing layer 16 and outer cover 18.

Inner tube 12 is an acrylonitrile-based rubber. Preferably, inner tube 12 is an acrylonitrile-butadiene rubber (NBR). An example formulation is as follows.

| Example Acrylonitrile-Based Rubber Formulation | |
|---|---|
| Compound Description | Parts |
| Nitrile Polymer | 80 |
| SBR Polymer | 20 |
| Carbon Black | 80 |
| Hard Clay | 56 |
| Zinc Oxide | 5 |
| Stearic Acid | 2 |
| Diphenylamine-Antioxidant | 1.5 |
| Dibutyl Phthalate-Plasticizer | 13 |
| Sulfur Accelerators | 2 |
| Sulfur | 2 |
| TOTAL | 261.5 |

Cured at 315° F. for 70 minutes

Reinforcing layer 14 may vary widely. They can be formed by braiding natural fibers, or synthetic fibers. Synthetic fibers can be glass fibers, polyester fibers, Kevlar® fibers or Nomex® fibers. Wire reinforcement is not used in the construction since they can be extracted quite easily from the hose during use resulting in an injury to the operator. Preferably, reinforcement layer 14 is made of aromatic polyamide fibers (Kevlar®). The incorporation of Kevlar® or other types of aramid fibers decreases the extent of hose volumetric expansion. Expansion of hoses reinforced with lesser textiles have been known to crush hose payout reels.

Layer 16 is thermosetting EPDM rubber. EPDM is a ethylene-propylene terpolymer. This is an elastomer based on stereospecific linear terpolymers of ethylene, propylene, and small amounts of a nonconjugated diene, e.g., a cyclic or aliphatic diene (hexadiene, dicyclopentadiene, or ethylidene norbornene). The unsaturated part of the polymer molecule is pendant from the main chain, which is completely saturated. EPDM works well in bonding well to the aforementioned reinforcements and the UHMW cover. The EPDM utilized in the construction is compounded to provide the excellent adhesion between hose parts.

An example of the EPDM formulation is as follows:

| Example EPDM Backing Layer Formulation | |
|---|---|
| Compound Description | Parts |
| EPDM Polymer | 135 |
| Carbon Black | 75 |
| Mineral Filler | 75 |
| Stearic Acid | 5 |
| Zinc Oxide | 5 |
| Diphenylamine-Antioxidant | 1 |
| Aromatic Oil-Plasticizer | 30 |
| Sulfur Accelerators | 2.5 |
| Sulfur | 0.5 |
| TOTAL | 299.75 |

Cured at 325° F. for 70 minutes

Outer layer 18 is a UHMW plastic finish such as UHMWPE. These ultra high molecular weight polyolefins are not very permeable to water and have excellent abrasion resistance. In addition to the UHMWPE's abrasion resistance, the material exhibits a very low coefficient of friction resulting in much easier hose routing in sewer environments. The UHMW polyolefin also provides the finished hose with a smooth appearance and is easy to clean or wash down. In addition to the low coefficient of friction, the UHMW material provides the necessary tear resistance of the finished hose product that ensures longevity in sewer cleaning applications. The UHMW polyolefins typically is ultra high molecular weight polyethylene. UHMWPE is a linear polyethylene with fewer than 1 side chain per 100 carbon atoms, preferably fewer than 1 side chain per 300 carbon atoms. The polyethylene may also contain minor amounts, preferably less than 5 mol. %, of one or more copolymerized other alkenes. For example, the other alkenes may be propylene, butylene, pentane, hexane, 4-methylpentene, octene, etc. The weight average molecular weight of the UHMWPE generally is at least $10^6$ g/mol. U.S. Pat. Nos. 5,621,070 and 5,507,993 further describe UHMW polyolefins in greater detail.

The UHMW polyolefin has high abrasion resistance, exceeding the abrasion resistance of steel. Broad chemical resistance and a low coefficient of friction makes the UHMW material very versatile. The material is nonconductive in nature.

Typical Properties of UHMW Material

| Property | Value | ASTM Test Method |
|---|---|---|
| Specific Gravity | 0.93 | — |
| Tensile Yield Strength (psi) | 6,000 | D882 |
| Ultimate Elongation (%) | 300 | D882 |
| Coefficient of Friction, Kinetic | 0.11–0.14 | — |
| Dielectric Strength (V/mil) | 3,000 | D149 |

The UHMWPE cover material provides the hose with not only advanced abrasion and cut resistance, but an overall low friction fact hose routing, but it also provides the operator with the ability of easier hose pay out. The polyamide reinforcement gives the hose the unique characteristic of low volumetric expansion, as well as low overall hose elongation. The reinforcement provides increased tensile strength and longer attachment to the cleaning forward propelling cleaning nozzles. Unlike other sewer hoses, this new prototype when constructed with polyamide fibers only requires one layer of overall reinforcement. Other sewer hoses on the market require two braided layers of reinforcement to provide the hose with the required pressure rating. The reduction in the number of braided layers gives the hose a compact configuration resulting in smaller reel sizes. The use of one braided layers gives the hose a lightweight characteristic as well. The weight of heavier hoses often exceeds the force of the nozzle pull resulting in the use of smaller reel quantities. Even with the use of only one reinforcement layer, a 3,000 psi maximum operating pressure can be observed in conjunction with a 9,000 psi minimum burst for a 1 inch I.D. hose. Therefore, a 3:1 safety operating factor can be observed.

Methods of fabricating the present hose assembly 10 are well known in the art. In the preferred embodiment, the layers are wrapped. One particular well known method involves a multi-part extrusion process typically known as "cross-head" extrusion. The typical "cross-head" extrusion method involves first extruding the one layer, then extruding another layer thereover. Coextrusion methods of fabricating also may be applicable. As commonly known in the art, coextrusion methods involve utilizing two or more extruders at once, thereby forming layers simultaneously. This method utilizes two sets of extruders so combined as to share a set of extrusion die assembly having concentrically arranged two annular orifices. One of the two extruders is connect to the inner orifice of the die while the other extruder is connected to the outer orifice of the die. The two extruders are operated simultaneously such that the inner and outer layers come into contact with each other while both the two kinds of rubbers are in plasticized state and are not yet exposed to the atmosphere. This method is efficient and has the advantage that a firm and reliable bonding of the layers can be accomplished.

Industry offers many surface treatments to enhance the bond of UHMW to elastomers in hose construction. Available treatments include: flame etching, corona modification, plasma modifications, sodium naphthalene etching and sodium ammonia etching. The hose's operating temperature is between −40° C. and 100° C. (−40° F. and 212° F.).

EXAMPLE

Hose samples having the following construction were tested as follows.
Tested Construction
Nitrile Tube (0.085" Gauge)
Kevlar® Reinforcement
EPDM Backing Layer (0.059" Gauge)
UHMW Polyethylene (0.005" Gauge)

Basic Test Results

1. Adhesion testing—ASTM Method.
Inner tube (rubber-nitrile) to reinforcement (treated isocyanate-Kevlar®)—11.28 lbs/in. (average of 3 measurement)
Reinforcement (isocyanate-treated Kevlar®) to backing layer (rubber-EPDM)—10.73 lbs/in. (average of 3 measurement)
Backing layer (rubber EPDM) to UHMW Polyethylene—16.00 lbs/in. (average of 3 measurement)
2. Abrasion Testing—IS06945.
Average weight loss of UHMW polyethylene following 10,000 abrasion cycles—0.005 grams
Average # of cycles until failure (textile reinforcement uncovered)—1,000,000 cycles
3. Elongation/Contraction Testing—SAE Method.
Average of 0.2% contraction of the hose at operating pressure (3,000 psi)
4. Leakage Testing—SAE Method
No leakage was observed after pressurizing the samples at 6,300 psi for five minute increments.
5. Burst Pressure Testing—SAE Method.
All tested samples exhibited a burst pressure value greater than 9,000 psi.
6. Impulse Testing—SAE Method.
Twelve samples were successfully impulsed at 3,000 psi for 100,000 cycles
7. Tensile Strength Testing (Assembly)—SAE Method
Three samples exhibited as average tensile strength of 7,800 lbs.

Discussion of Test Results

1. The results of the adhesion testing show excellent bonding of the inner tube to the reinforcement, reinforcement to the backing layer and backing layer to UHMW outer cover.
2. The abrasion testing shows the UHMWPE cover material provides the hose with advanced abrasion, cut resistance, and further iterates the idea of the low coefficient of friction.

3. These results show excellent dimensional stability with low volumetric expansion and low overall hose elongation.

5. This test shows a 9,000 psi minimum burst for a 1 inch I.D. hose. Therefore, a 3:1 safety operating factor can be observed.

6. This test shows a 3,000 psi maximum operating pressure can be used in conjunction with the minimum burst pressure from test 4.

7. This test shows excellent tensile strength.

In addition to these embodiments, persons skilled in the art can see that numerous modifications and changes can be made to the above invention without departing from the intended spirit and scope thereof.

I claim:

1. A hose comprising:
   an inner tube of an acrylonitrile rubber layer;
   a reinforcing layer adjacent the inner tube;
   an EPDM rubber layer adjacent the reinforcing layer; and
   a UHMW plastic outer cover adjacent the EPDM layer wherein the UHMW plastic is UHMW polyolefin.

2. A hose according to claim 1 wherein the UHMW plastic is UHMW polyethylene.

3. A hose according to claim 1 wherein the UHMW polyethylene has a weight average molecular weight of $10^6$ g/mol.

4. A hose according to claim 3 wherein the reinforcing layer is a braided fabric.

5. A hose according to claim 1 wherein the reinforcing layer is a single layer of a braided fabric.

6. A hose according to claim 1 wherein the reinforcing layer is made of aromatic polyamide fibers.

7. A hose according to claim 1 wherein the acrylonitrile rubber is acrylonitrile-butadiene rubber.

8. A hose according to claim 1 having a six inch minimum bend radius for a one inch inside diameter hose.

9. A hose comprising:
   an inner tube of an acrylonitrile-butadiene rubber layer;
   a reinforcing layer of a braided fabric made of aromatic polyamide fibers adjacent the inner tube;
   an EPDM rubber layer adjacent the reinforcing layer; and
   a UHMW polyethylene outer cover adjacent the EPDM layer.

10. A hose according to claim 9 having a six inch minimum bend radius for a one inch inside diameter hose.

11. A hose according to claim 9 wherein the reinforcing layer is a single layer of the braided fabric.

12. A hose according to claim 9 wherein the UHMW polyethylene has a weight average molecular weight of $10^6$ g/mol.

* * * * *